United States Patent
McSorely

(10) Patent No.: US 9,792,130 B2
(45) Date of Patent: Oct. 17, 2017

(54) REBOOTING TO A UEFI APPLICATION FROM A UEFI SUPPORTED SYSTEM

(71) Applicant: Avast Software s.r.o., Prague (CZ)

(72) Inventor: Aaron McSorely, Austin, TX (US)

(73) Assignee: AVAST SOFTWARE S.R.O., Prague (CZ)

(*) Notice: Subject to any disclaimer, the term of this patent is extended or adjusted under 35 U.S.C. 154(b) by 93 days.

(21) Appl. No.: 14/996,788

(22) Filed: Jan. 15, 2016

(65) Prior Publication Data

US 2016/0210163 A1    Jul. 21, 2016

Related U.S. Application Data

(60) Provisional application No. 62/103,943, filed on Jan. 15, 2015.

(51) Int. Cl.
G06F 15/177 (2006.01)
G06F 9/445 (2006.01)
G06F 9/44 (2006.01)

(52) U.S. Cl.
CPC ........ G06F 9/44505 (2013.01); G06F 9/4401 (2013.01); *G06F 9/4406* (2013.01)

(58) Field of Classification Search
CPC ............................ G06F 9/44505; G06F 9/4401
USPC .................................................. 713/2
See application file for complete search history.

(56) References Cited

U.S. PATENT DOCUMENTS

| 7,565,517 | B1* | 7/2009 | Arbon | G06F 8/63 709/220 |
| 8,499,142 | B1* | 7/2013 | Ramamurthy | G06F 9/4406 713/1 |
| 8,732,418 | B1* | 5/2014 | Abdulla | G06F 11/1471 707/657 |
| 2004/0024635 | A1* | 2/2004 | McClure | G07C 13/00 705/12 |
| 2007/0061563 | A1* | 3/2007 | Babbitt | G06F 9/4406 713/2 |
| 2008/0052507 | A1* | 2/2008 | Chow | G06F 21/568 713/2 |
| 2009/0013409 | A1* | 1/2009 | Wenzinger | G06F 8/60 726/24 |
| 2011/0047129 | A1* | 2/2011 | Wang | G06F 11/1469 707/675 |
| 2012/0023491 | A1* | 1/2012 | Gattegno | G06F 8/63 717/175 |
| 2014/0208089 | A1* | 7/2014 | Satam | G06F 9/44505 713/2 |
| 2015/0067317 | A1* | 3/2015 | Bisht | G06F 9/4411 713/2 |

OTHER PUBLICATIONS

FixMeStick Virus Removal Device, https://www.fixmestick.com/fixmestick.html, 2015, 3 pages, FixMeStick Technologies. Accessed Apr. 18, 2016.

* cited by examiner

*Primary Examiner* — Jaweed A Abbaszadeh
*Assistant Examiner* — Volvick DeRose
(74) *Attorney, Agent, or Firm* — Husch Blackwell LLP

(57) ABSTRACT

Systems and methods for rebooting a UEFI based system, for example from Microsoft Windows, to any UEFI application, include modifying boot configuration data by inserting a boot entry into the UEFI firmware boot manager to cause execution of a non-Windows UEFI application.

18 Claims, 6 Drawing Sheets

300

301

```
Windows Registry Editor Version 5.00

[HKEY_USERS\BCDTempHive\Objects\%bcdid%]

[HKEY_USERS\BCDTempHive\Objects\%bcdid%\Description]
"Type"=dword:101fffff

[HKEY_USERS\BCDTempHive\Objects\%bcdid%\Elements]

[HKEY_USERS\BCDTempHive\Objects\%bcdid%\Elements\12000002]
"Element"="\\EFI\\AVAST\\bootx64.efi"

[HKEY_USERS\BCDTempHive\Objects\%bcdid%\Elements\12000004]
"Element"="AvastGrimefighter"
```

302

```
HKEY_USERS\BCDTempHive\Objects [1 5 8]
```

```
Firmware Boot Manager
-----------------------
identifier              {fwbootmgr}
displayorder            {bootmgr}
                        {f90f5949-13e3-11e4-8264-806e6f6e6963}
timeout                 0

Windows Boot Manager
-----------------------
identifier              {bootmgr}
device                  partition=\Device\HarddiskVolume2
path                    \EFI\Microsoft\Boot\bootmgfw.efi
description             Windows Boot Manager
locale                  en-US
inherit                 {globalsettings}
integrityservices       Enable
default                 {current}
resumeobject            {cbb56868-e457-11e3-87d1-f8a96330aff2}
displayorder            {current}
toolsdisplayorder       {memdiag}
timeout                 0

Firmware Application (101fffff)
-------------------------------
identifier              {d3ca2ead-4ef9-11e4-8278-806e6f6e6963}
description             EFI Network 0 for IPv4

Firmware Application (101fffff)
-------------------------------
identifier              {f90f5f94-13e3-11e4-8264-806e6f6e6963}
description             EFI USB Device
```

FIG. 4

```
Firmware Boot Manager
----------------------
identifier              {fwbootmgr}
displayorder            {bootmgr}
                        {f90f5949-13e3-11e4-8264-806e6f6e6963}
bootsequence            {8a21ad69-7c4a-4cd4-9c1d-2c9256314fda}
timeout                 0

Windows Boot Manager
----------------------
identifier              {bootmgr}
device                  partition=\Device\HarddiskVolume2
path                    \EFI\Microsoft\Boot\bootmgfw.efi
description             Windows Boot Manager
locale                  en-US
inherit                 {globalsettings}
integrityservices       Enable
default                 {current}
resumeobject            {cbb56868-e457-11e3-87d1-f8a96330aff2}
displayorder            {current}
toolsdisplayorder       {memdiag}
timeout                 0

Firmware Application (101fffff)
----------------------------------
identifier              {8a21ad69-7c4a-4cd4-9c1d-2c9256314fda}
device                  partition=\Device\HarddiskVolume2
path                    \EFI\AVAST\bootx64.efi
description             AvastGrimefighter Firmware Application (101fffff)
----------------------------------
identifier              {d3ca2ead-4ef9-11e4-8278-806e6f6e6963}
description             EFI Network 0 for IPv4

Firmware Application (101fffff)
----------------------------------
identifier              {f90f5f94-13e3-11e4-8264-806e6f6e6963}
description             EFI USB Device
```

FIG. 5

REBOOTING TO A UEFI APPLICATION FROM A UEFI SUPPORTED SYSTEM

RELATED APPLICATION

This application claims the priority benefit of U.S. Provisional Application No. 62/103,943, filed Jan. 15, 2015. The disclosure of the above-referenced application is incorporated herein by reference in its entirety.

FIELD

The disclosure relates generally to rebooting to an application, and more particularly, to rebooting a UEFI based system to a UEFI application

BACKGROUND

UEFI (Unified Extensible Firmware Interface) is a model for the interface between personal computer operating systems and platform firmware. UEFI was preceded by EFI (Extensible Firmware Interface) as a result, EFI designations are assumed to be part of UEFI. UEFI defines a set of data tables which contain platform related information, and provide boot and runtime services to the operating system loader. UEFI is replacing BIOS as the interface between the personal computer platform and the operating system.

UEFI typically provides a platform firmware menu which allows selection of an operating system loader. The UEFI firmware boot manager can load any application written to the UEFI specification. In general, the operating system loader application file is loaded from the ESP (EFI System Partition). UEFI uses NVRAM variables to locate and load the application file. UEFI allows multiple entries in the NVRAM for selecting between multiple operating system loaders, and EFI applications.

Conventional boot loaders, such as the Microsoft Windows boot loader will typically only load Microsoft EFI applications, and Microsoft Windows does not provide a method for adding arbitrary entries to the UEFI firmware boot manager from within the Windows operating system.

BRIEF DESCRIPTION OF THE DRAWINGS

For a better understanding of the inventive subject matter, reference may be made to the accompanying drawings in which:

FIG. 3 illustrates an example of a Windows registry object file for the firmware boot entry for a new application, and an example of a Windows registry permission file.

FIG. 4 illustrates example UEFI firmware boot entries before adding a new custom entry to the firmware.

FIG. 5 illustrates example UEFI firmware boot entries after adding a new custom entry to the firmware.

DETAILED DESCRIPTION

Figure 1:
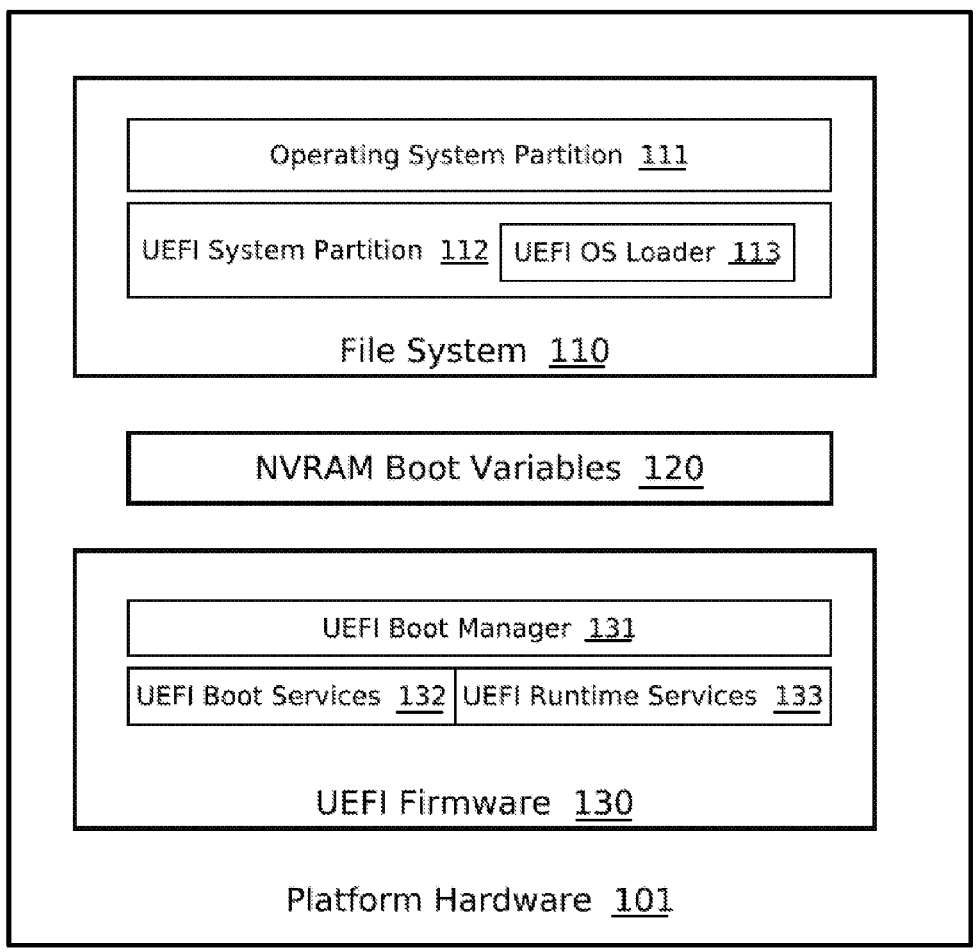
FIG. 1 is a block diagram of a UEFI system on a personal computer system, and the associated parts used for booting to an operating system.

In the following detailed description of example embodiments of the invention, reference is made to the accompanying drawings that form a part hereof, and in which is shown by way of illustration specific example embodiments in which the invention may be practiced. These embodiments are described in sufficient detail to enable those skilled in the art to practice the inventive subject matter, and it is to be understood that other embodiments may be utilized and that logical, mechanical, electrical and other changes may be made without departing from the scope of the inventive subject matter.

Some portions of the detailed descriptions which follow are presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, teams such as "processing" or "computing" or "calculating" or "determining" or "displaying" or the like, refer to the action and processes of a computer system, or similar computing device, that manipulates and transforms data represented as physical (e.g., electronic) quantities within the computer system's registers and memories into other data similarly represented as physical quantities within the computer system memories or registers or other such information storage, transmission or display devices.

In the Figures, the same reference number is used throughout to refer to an identical component that appears in multiple Figures. Signals and connections may be referred to by the same reference number or label, and the actual meaning will be, clear from its use in the context of the description. In general, the first digit(s) of the reference number for a given item or part of the invention should correspond to the Figure number in which the item or part is first identified.

The description of the various embodiments is to be construed as examples only and does not describe every possible instance of the inventive subject matter. Numerous alternatives could be implemented, using combinations of current or future technologies, which would still fall within the scope of the claims. The following detailed description is, therefore, not to be taken in a limiting sense, and the scope of the inventive subject matter is defined only by the appended claims.

The disclosure includes systems and methods for rebooting a UEFI based system, for example from Microsoft Windows, to any UEFI application, using, in some embodiments, tools native to Microsoft Windows. For example, in some embodiments, boot configuration data can be modified by inserting a boot entry into the UEFI firmware boot manager to cause execution of a non-Windows UEFI application.

FIG. 1 is a block diagram of a UEFI based computer system platform 100 including the platform hardware 101, which can include the UEFI firmware 130, non-volatile random access memory (NVRAM) boot variables 120, and file system 110. The file system 110 can reside on a storage media such as a hard disk, flash memory or solid state drive connected to the platform hardware.

File system 110 can include an operating system (OS) partition 111 and a UEFI system partition 112. The OS partition 111 can be used to store files and data used by an OS such as a version of the Microsoft Windows operating system, Unix, Linux, or other OS now known or developed in the future. UEFI system partition 112 can be used to store a UEFI OS loader 113, which can comprise software to start an OS stored on OS partition 111 and other utility software.

UEFI Firmware 130 can include a UEFI boot manager 131, UEFI boot services 132 and UEFI runtime services 133. UEFI boot manager 131 can be software that can be used to determine which application or applications on the UEFI system partition 112 are started when a system including platform hardware 101 is booted. UEFI boot manager 131 can read a boot configuration from NVRAM boot variables 120, can be based on the configuration data, determine which operating system loader or other applications to start at boot time. The NVRAM boot variables can include paths to operating system loaders or kernels, and other data for use during boot time.

UEFI boot services 132 can include UEFI related software routines that provide services that are to be available for use during a boot phase of the system. In some aspects, after the operating system is loaded and running, UEFI boot services 132 are no longer available.

UEFI runtime services 133 can include UEFI related software routines that provide services that are to be available after the operating system is loaded and running.

Figure 2:
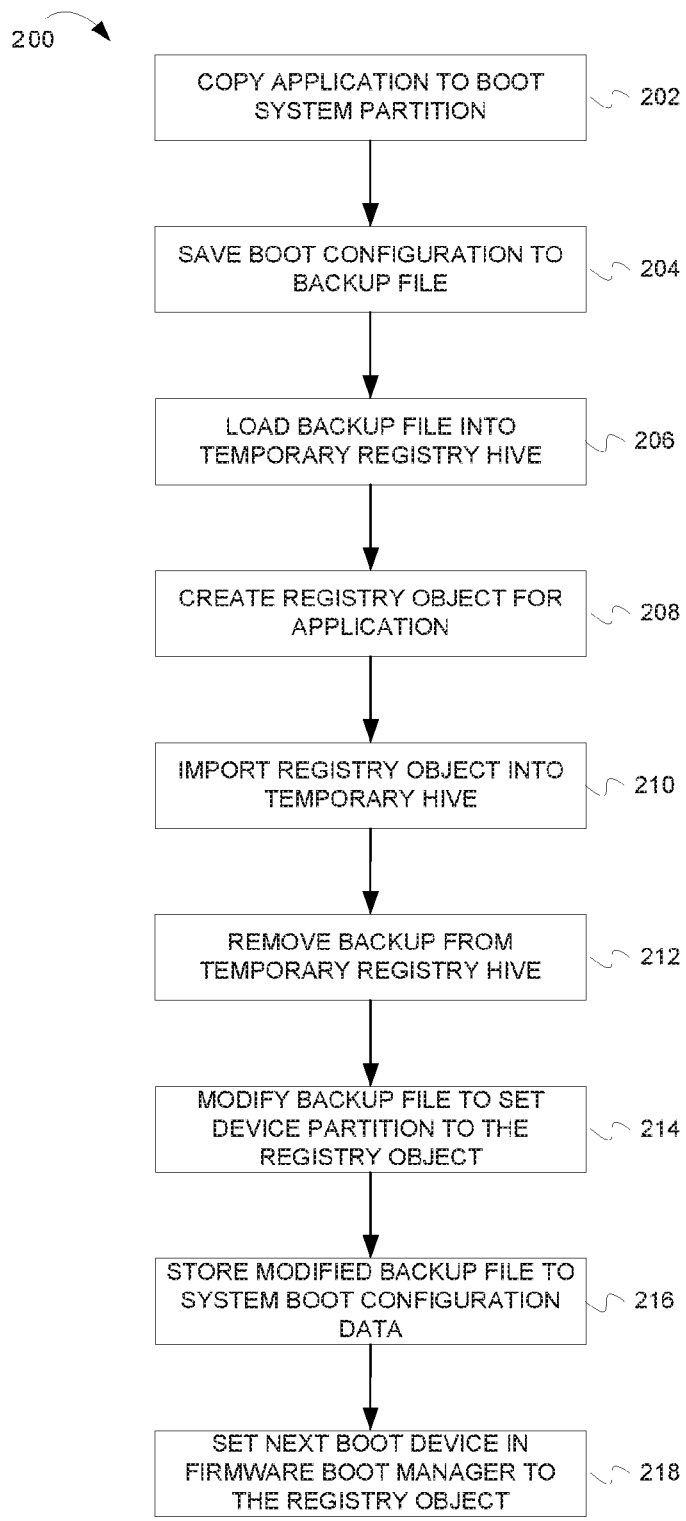
FIG. 2 is a flow chart illustrating operations of a method to add a new boot entry to the UEFI firmware boot manager from a Microsoft Windows operating system, with example implementation commands.

FIG. 2 is a flow chart illustrating operations of a method to add a new boot entry for a UEFI boot manager 131. In some embodiments, the UEFI boot manager 131 may be a boot manager for a version of a Microsoft Windows operating system. The method illustrated in FIG. 2 may be performed by a user-executed application.

At block 202, an application is copied to the ESP (e.g., UEFI system partition 112). The application can be an EFI or UEFI application. In embodiments running on a version of a Microsoft Windows operating system, the following series of commands may be used:

mountvol s: /s
mkdir s:\EFI\AVAST
copy /y c:\jumpshot\efi\boot\bootx64.efi s:\EFI\AVAST where "s" is the drive letter that will be used for the ESP, and where the "/s" flag indicates to the "mountvol" command that the ESP is being mounted on the specified driver letter ("s"). In the example illustrated above, the "bootx64.efi" can be any file that meets the UEFI image file specification. The file may contain executable code that can be an application, an operating system loader, or runtime drivers. The file can be copied to the ESP using the specified target subdirectory (in this example, "\EFI\AVAST"). In general, the target directory can be a directory that is registered at the URL www.uefi.org/registry, however this is not a requirement.

At block 204, boot configuration data is exported (i.e., saved) to a backup file. In embodiments running on a version of the Microsoft Windows operating system, the command "bcdedit/export bcdbackup" is used to cause a backup of the boot configuration data to be stored in the backup file named "bcdbackup."

At block 206, the backup file created at block 204 is loaded into a temporary registry location (e.g., a temporary registry hive). In embodiments running on a version of the Microsoft Windows operating system, the command "reg load HKU\BCDTempHive bcdbackup" can be used to cause the backup file named "bcdbackup" to be loaded into the registry hive "HKU\BCDTempHive." In some embodiments, the hive containing the active or running BCD (Boot Configuration Data) cannot be edited directly. Thus some embodiments create a backup file of the active BCD (e.g., "bcdbackup"), and import the backup file into a temporary location in the registry (e.g., "BCDTempHive).

At block 208, a registry object can be created for the EFI application. An example registry object file that can be used to supply values for the registry object is described below with reference to FIG. 3.

At block 210, the registry object created at block 208 can be imported into the temporary registry location. In embodiments running on a version of the Microsoft Windows operating system, the following commands may be issued:

regini bcdhiveperms.txt
reg import bcdfwentry.reg

The "regini" command is used to set permission for registry entries. An example of the permissions file "bcdhiveperms.txt" is described below with reference to FIG. 3. Typically, full permissions to edit the registry entry are granted to the Administrator group and the Creator group. The "reg import" command imports a registry object from a file. An example registry object file is also described below with reference to FIG. 3.

At block 212, the backup can be unloaded from the temporary BCD store hive. In embodiments running on a version of the Microsoft Windows operating system, the command "reg unload HKU\BCDTempHive"may be issued.

At block 214, the method modifies the backup by setting the device partition to the ESP for the new object created at block 208 and imported at block 210. In embodiments running on a version of the Microsoft Windows operating system, the command "bcdedit /store bcdbackup /set %bcdid% device partition=s:" can be issued, where "bcdbackup" is the backup created at block 204, and the parameter "%bcdid% is a unique identifier generated by the user-executed application. For example, the "%bcdid%" parameter may be a Globally Unique Identifier (GUID)

At block 216, the BCD store backup file modified at block 214 is imported to the system BCD store. In embodiments running on a version of the Microsoft Windows operating system, the command "bcdedit /import bcdbackup /clean" can be issued. The "clean" parameter causes any pre-existing firmware boot entries to be deleted upon import of the modified backup in order to avoid duplicate boot entries.

At block 218, the method sets the next boot device in the firmware boot manager to the new object. In embodiments running on a version of the Microsoft Windows operating system, the command "bcdedit /set {fwbootmgr} bootsequence %bcdid%" can be issued.

FIG. 3 illustrates an example of a Windows registry object file 301 for the firmware boot entry for a new application. The "type" parameter of the firmware boot entry for the application specifies a hexadecimal value of "101fffff", which identifies the entry as a firmware application. The registry object path element has been set to "\\EFI\\AVAST\\bootx64.efi to specify the pathname on the ESP for the file that is to be loaded and run at boot time. In the example, the entry has been given a description of "AvastGrimefighter."

FIG. 3 also illustrates an example of a Windows registry permission file 302. In the example, the permissions have a value of "1 5 8", which indicates the permissions assigned to the administrator, creator, and world (all other users) for the object. The value "1 5 8" indicates that the administrator has full control of the object ("1"), the creator has full control of the object ("5"), and the world (i.e., all other users) have read-only permission ("8").

FIG. 4 illustrates example UEFI firmware boot entries before adding a new custom entry to the firmware. In particular, boot manager entries 401 represents an example state of the boot configuration data before the method in flow chart 200 has been executed.

FIG. 5 illustrates example UEFI firmware boot entries after adding a new custom entry to the firmware. In particular, boot manager entries 501 represents an example state of the boot configuration data after the method in flow chart 200 has been executed. The example boot manager entries 501 reflect the example paths and names described above with reference to flow chart 200 (FIG. 2) and Windows registry object file 301 (FIG. 3). Those of skill in the art having the benefit of the disclosure will appreciate that the paths and file names used are somewhat arbitrary. For example, as long as the path and file name are valid and on a file system that is accessible to the EFI firmware (e.g., the EFI System Partition), the choice of paths and file names can vary in different embodiments.

In the example illustrated in FIG. 5, a new UEFI application has been entered in the UEFI firmware boot entries with the description "AvastGrimeFighter." Additionally, in the example, the "bootsequence" parameter has been set to the identifier of the new UEFI application entry to cause the new UEFI application to run at boot time.

Figure 6:
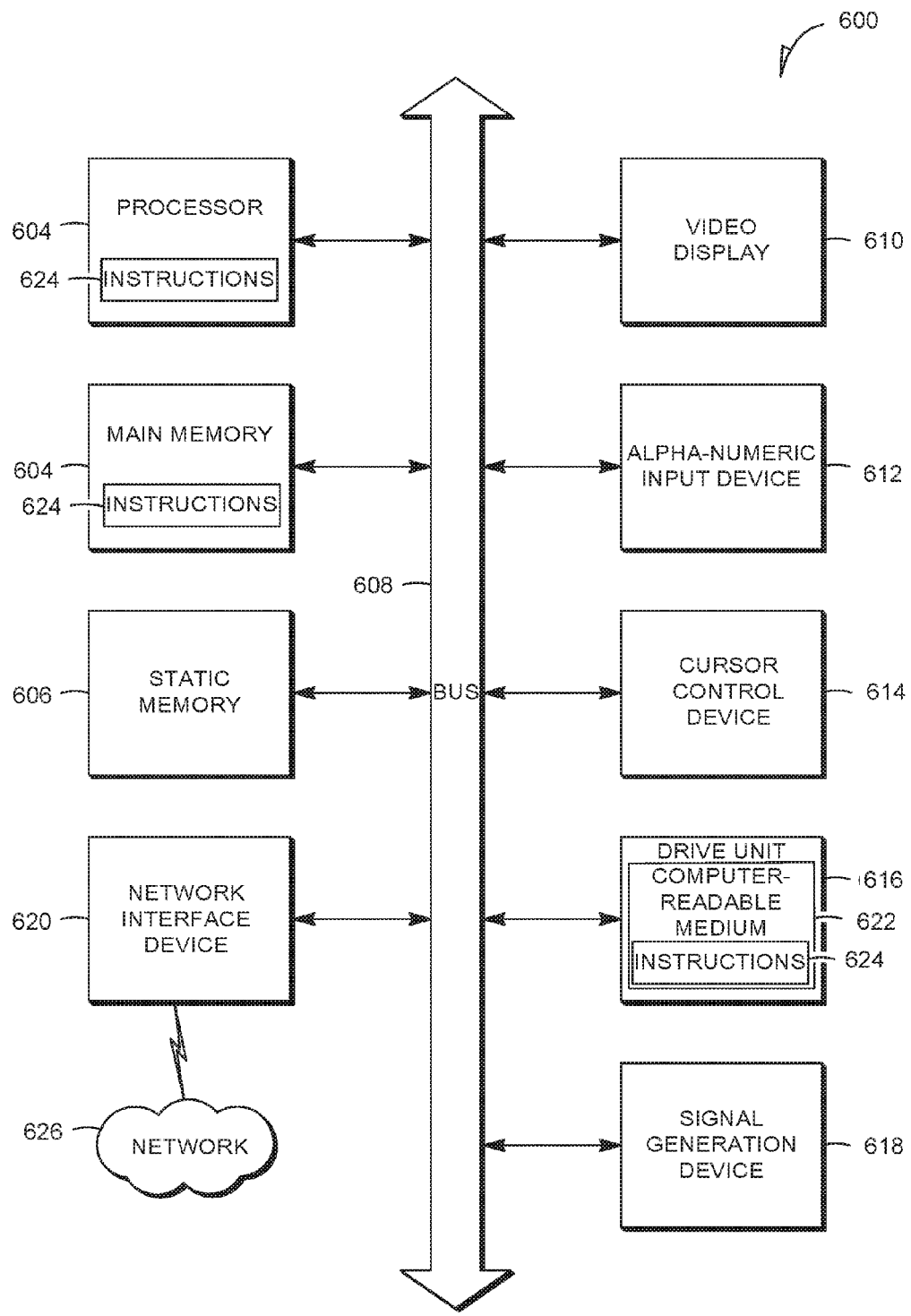
FIG. 6 is a block diagram of an example embodiment of a computer system upon which embodiments of the inventive subject matter can execute.

FIG. 6 is a block diagram of an example embodiment of a computer system 600 upon which embodiments of the inventive subject matter can execute. The description of FIG. 6 is intended to provide a brief, general description of suitable computer hardware and a suitable computing environment in conjunction with which the invention may be implemented. In some embodiments, the inventive subject matter is described in the general context of computer-executable instructions, such as program modules, being executed by a computer. Generally, program modules include routines, programs, objects, components, data structures, etc., that perform particular tasks or implement particular abstract data types.

As noted above, the system as disclosed herein can be spread across many physical hosts. Therefore, many systems and sub-systems of FIG. 6 can be involved in implementing the inventive subject matter disclosed herein.

Moreover, those skilled in the art will appreciate that the invention may be practiced with other computer system configurations, including hand-held devices, multiprocessor systems, microprocessor-based or programmable consumer electronics, network PCS, minicomputers, mainframe computers, and the like. Embodiments of the invention may also be practiced in distributed computer environments where tasks are performed by I/O remote processing devices that are linked through a communications network. In a distributed computing environment, program modules may be located in both local and remote memory storage devices.

In the embodiment shown in FIG. 6, a hardware and operating environment is provided that is applicable to both servers and/or remote clients.

With reference to FIG. 6, an example embodiment extends to a machine in the example faun of a computer system 600 within which instructions for causing the machine to perform any one or more of the methodologies discussed herein may be executed. In alternative example embodiments, the machine operates as a standalone device or may be connected (e.g., networked) to other machines. In a networked deployment, the machine may operate in the capacity of a server or a client machine in server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 600 may include a processor 602 (e.g., a central processing unit (CPU), a graphics processing unit (GPU) or both), a main memory 604 and a static memory 606, which communicate with each other via a bus 608. The computer system 600 may further include a video display unit 610 (e.g., a liquid crystal display (LCD) or a cathode ray tube (CRT)). In example embodiments, the computer system 600 also includes one or more of an alpha-numeric input device 612 (e.g., a keyboard), a user interface (UI) navigation device or cursor control device 614 (e.g., a mouse), a disk drive unit 616, a signal generation device 618 (e.g., a speaker), and a network interface device 620.

The disk drive unit 616 includes a machine-readable medium 622 on which is stored one or more sets of instructions 624 and data structures (e.g., software instructions) embodying or used by any one or more of the methodologies or functions described herein. The instructions 624 may also reside, completely or at least partially, within the main memory 604 or within the processor 602 during execution thereof by the computer system 600, the main memory 604 and the processor 602 also constituting machine-readable media.

While the machine-readable medium 622 is shown in an example embodiment to be a single medium, the term "machine-readable medium" may include a single medium or multiple media (e.g., a centralized or distributed database, or associated caches and servers) that store the one or more instructions. The term "machine-readable medium" shall also be taken to include any tangible medium that is capable of storing, encoding, or carrying instructions for execution by the machine and that cause the machine to perform any one or more of the methodologies of embodiments of the present invention, or that is capable of storing, encoding, or carrying data structures used by or associated with such instructions. The term "machine-readable storage medium" shall accordingly be taken to include, but not be limited to, solid-state memories and optical and magnetic media that can store information in a non-transitory manner, i.e., media that is able to store information. Specific examples of machine-readable media include non-volatile memory, including by way of example semiconductor memory devices (e.g., Erasable Programmable Read-Only Memory (EPROM), Electrically Erasable Programmable Read-Only Memory (EEPROM), and flash memory devices); magnetic disks such as internal hard disks and removable disks; magneto-optical disks; and CD-ROM and DVD-ROM disks.

The instructions 624 may further be transmitted or received over a communications network 626 using a signal transmission medium via the network interface device 620 and utilizing any one of a number of well-known transfer protocols (e.g., FTP, HTTP). Examples of communication networks include a local area network (LAN), a wide area network (WAN), the Internet, mobile telephone networks, Plain Old Telephone (POTS) networks, and wireless data networks (e.g., WiFi and WiMax networks). The term "machine-readable signal medium" shall be taken to include any transitory intangible medium that is capable of storing, encoding, or carrying instructions for execution by the machine, and includes digital or analog communications signals or other intangible medium to facilitate communication of such software.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

As is evident from the foregoing description, certain aspects of the inventive subject matter are not limited by the particular details of the examples illustrated herein, and it is therefore contemplated that other modifications and applications, or equivalents thereof, will occur to those skilled in the art. It is accordingly intended that the claims shall cover all such modifications and applications that do not depart from the spirit and scope of the inventive subject matter. Therefore, it is manifestly intended that this inventive subject matter be limited only by the following claims and equivalents thereof.

The Abstract is provided to comply with 37 C.F.R. § 1.72(b) to allow the reader to quickly ascertain the nature and gist of the technical disclosure. The Abstract is submitted with the understanding that it will not be used to limit the scope of the claims.

What is claimed is:

1. A method for causing a computer system to boot an application, the method comprising:
  copying the application to a boot system partition;
  saving boot configuration data for the computer system to a backup file;
  loading the boot configuration data into a temporary location;
  creating a registry object for the application;
  storing the registry object into the temporary location;
  creating a modified backup file by modifying the backup file to set a device partition for the registry object in the backup file;
  storing the modified backup file to the boot configuration data; and
  setting a next boot device value in a firmware boot manager to indicate the registry object.

2. The method of claim 1, wherein copying the application to the boot system partition includes mounting an EFI system partition, and copying an EFI application file to a directory on the EFI system partition.

3. The method of claim 1, wherein saving the boot configuration data to the backup file includes the executing a bcdedit utility to export the boot configuration data to a file on a file system.

4. The method of claim 1, wherein loading the boot configuration data into the temporary location includes executing a registry editing utility.

5. The method of claim 1, wherein the temporary location is a temporary registry location.

6. The method of claim 1, wherein loading the boot configuration data into the temporary location includes loading the boot configuration data from the backup file.

7. An apparatus comprising:
  one or more processors; and
  a machine-readable medium coupled to the one or more processors, the machine-readable medium having stored thereon instructions, that when executed, cause the one or more processors to:
    copy an application to a boot system partition,
    save boot configuration data to a backup file;
    load the boot configuration data into a temporary location,
    create a registry object for the application,
    store the registry object into the temporary location,
    create a modified backup file by modifying the backup file to set a device partition for the registry object in the backup file,
    store the modified backup file to the boot configuration data, and
    set a next boot device value in a firmware boot manager to indicate the registry object.

8. The apparatus of claim 7, wherein the instructions to copy the application to the boot system partition include instructions to mount an EFI system partition, and copy an EFI application file to a directory on the EFI system partition.

9. The apparatus of claim 7, wherein the instructions to save the boot configuration data to the backup file include instructions to execute a bcdedit utility to export the boot configuration data to a file on a file system.

10. The apparatus of claim 7, wherein the instructions to load the boot configuration data into the temporary location include instructions to execute a registry editing utility.

11. The apparatus of claim 7, wherein the temporary location is a temporary registry location.

12. The apparatus of claim 7, wherein the instructions to load the boot configuration data into the temporary location include instructions to load the boot configuration data from the backup file.

13. A non-transitory machine-readable medium having stored thereon instructions, that when executed, cause one or more processors to:
  copy an application to a boot system partition;
  save boot configuration data to a backup file;
  load the boot configuration data into a temporary location;
  create a registry object for the application;
  store the registry object into the temporary location;
  create a modified backup file by modifying the backup file to set a device partition for the registry object in the backup file;
  store the modified backup file to the boot configuration data; and
  set a next boot device value in a firmware boot manager to indicate the registry object.

14. The non-transitory machine-readable medium of claim 13, wherein the instructions to copy the application to the boot system partition include instructions to mount an EFI system partition, and copy an EFI application file to a directory on the EFI system partition.

15. The non-transitory machine-readable medium of claim 13, wherein the instructions to load the boot configuration data into the temporary location include instructions to load the boot configuration data from the backup file.

16. The non-transitory machine-readable medium of claim 13, wherein the instructions to save the boot configuration data to the backup file include instructions to execute a bcdedit utility to export the boot configuration data to a file on a file system.

17. The non-transitory machine-readable medium of claim 13, wherein the instructions to load the boot configuration data into the temporary location include instructions to execute a registry editing utility.

18. The non-transitory machine-readable medium of claim 13, wherein the temporary location is a temporary registry location.

\* \* \* \* \*